United States Patent [19]

Ezekiel

[11] Patent Number: 5,790,977
[45] Date of Patent: Aug. 4, 1998

[54] DATA ACQUISITION FROM A REMOTE INSTRUMENT VIA THE INTERNET

[75] Inventor: David Ezekiel, Santa Rosa, Calif.

[73] Assignee: Hewlett-Packard Company, Palo Alto, Calif.

[21] Appl. No.: 795,443

[22] Filed: Feb. 6, 1997

[51] Int. Cl.⁶ .................................................. G06F 17/00
[52] U.S. Cl. .............. 702/122; 395/200.48; 395/200.59; 380/49; 380/25
[58] Field of Search ................ 364/579; 395/200.47, 395/200.49, 200.33, 200.57, 187.01, 188.01, 500, 200.48, 200.59; 380/4, 25, 49

[56] References Cited

U.S. PATENT DOCUMENTS

| | | | |
|---|---|---|---|
| 5,062,059 | 10/1991 | Youngblood et al. | 395/200.47 |
| 5,349,678 | 9/1994 | Morris et al. | 395/200.49 |
| 5,375,207 | 12/1994 | Blakely et al. | 395/200.33 |
| 5,544,320 | 8/1996 | Konrad | 395/200.33 |
| 5,553,239 | 9/1996 | Heath et al. | 395/187.01 |
| 5,657,390 | 8/1997 | Elgamal et al. | 380/49 |
| 5,708,780 | 1/1998 | Levergood et al. | 1/1 |

OTHER PUBLICATIONS

Bob Cutler, "LAN in an Instrument: Two Years of Practical Use": A four page unpublished paper which describes use of an LAN option for the HP89400 series of vector signal analysers.

*Primary Examiner*—John E. Barlow, Jr.
*Assistant Examiner*—Bryan Bui

[57] ABSTRACT

Remote access is provided from a remote host system to an instrument. Control and data acquisition software is stored within the instrument. In response to the remote host system, the control and data acquisition software is forwarded to the remote host system. The control and data acquisition software is run on the remote host system. In response to control commands from the control and data acquisition software running on the remote host system, data acquisition of the instrument is controlled. In response to a request from the control and data acquisition software running on the remote host system, acquired data is forwarded from the instrument to the remote host system.

21 Claims, 5 Drawing Sheets

DATA ACQUISITION FROM A REMOTE INSTRUMENT VIA THE INTERNET

BACKGROUND

The present invention concerns communications with analytical instruments and pertains particularly to the data acquisition from a remote instrument, for example using a network browser on the World Wide Web.

In recent years there has been progress in both telecommunications technology and computing technology. Through the proliferation of on-line services and internet services, a wealth of information is available to a user having access to a personal computer and a modem. In order to allow users of the internet to take advantage of the explosion of information available on the internet, as well as a catalyst for information being made available, a number of hardware and software products have been developed.

For example, web browsers available from various companies allow users to "surf" within the World Wide Web. The Netscape Navigator web browser, for example, is available from Netscape Communications Corporation. Use of web browsers over the World Wide Web facilitates the communication of graphics, audio and video data, as well as text.

In order to reduce the software incompatibility of information communicated over the internet, various languages have been proposed for development of applications which utilize the world wide web. For example, the JAVA programming language, available from Sun Microsystems, is increasingly used to develop applications which communicate over the World Wide Web. Theoretically, use of the JAVA programming language allows for smooth and versatile communication between computing systems even when the computing systems are operating on different hardware platforms and are using different operating systems.

As the ability and versatility of communication over the internet increases, there is much consideration and developmental effort being invested to determine new and innovative ways to take advantage of this rapidly developing technology.

SUMMARY OF THE INVENTION

In accordance with the preferred embodiment of the present invention, remote access is provided from a remote host system to an instrument. Control and data acquisition software is stored within the instrument. In response to the remote host system, the control and data acquisition software is forwarded to the remote host system. The control and data acquisition software is run on the remote host system. In response to control commands from the control and data acquisition software running on the remote host system, data acquisition of the instrument is controlled. In response to a request from the control and data acquisition software running on the remote host system, acquired data is forwarded from the instrument to the remote host system.

For example, in the preferred embodiment, the control and data acquisition software runs as an application within an internet browser. In this case, the control and data acquisition software can be forwarded to the remote host system in response to a HyperText Transfer Protocol (HTTP) server GET command.

In the preferred embodiment of the present invention, when the control and data acquisition software is run on the remote host system, a user of the remote host system is provided with a graphical user interface which the user can utilize to interact with the instrument. The data received from the instrument by the remote host system is displayed on the host system, for example as traces on a graticule. The data may be additionally processed at the remote host system before being displayed.

The present invention provides for remote data acquisition from an instrument to be performed over the internet. Using the present invention, client software can run on any internet browser on almost all platforms. Transparent to the user, software used to run the instrument can be updated. The present invention additionally allows for the partitioning of the display and sensor portions of an instruments which allows for a significant reduction in the cost of instrument hardware and higher performance of the instrument as client platforms increase in capability in the installed base. The present invention also allows for instruments to access other instruments, directly controlling and acquire data from each other over a network. Further, for systems applications, a single client can connect to many instruments.

DESCRIPTION OF THE PREFERRED EMBODIMENT

Figure 1:
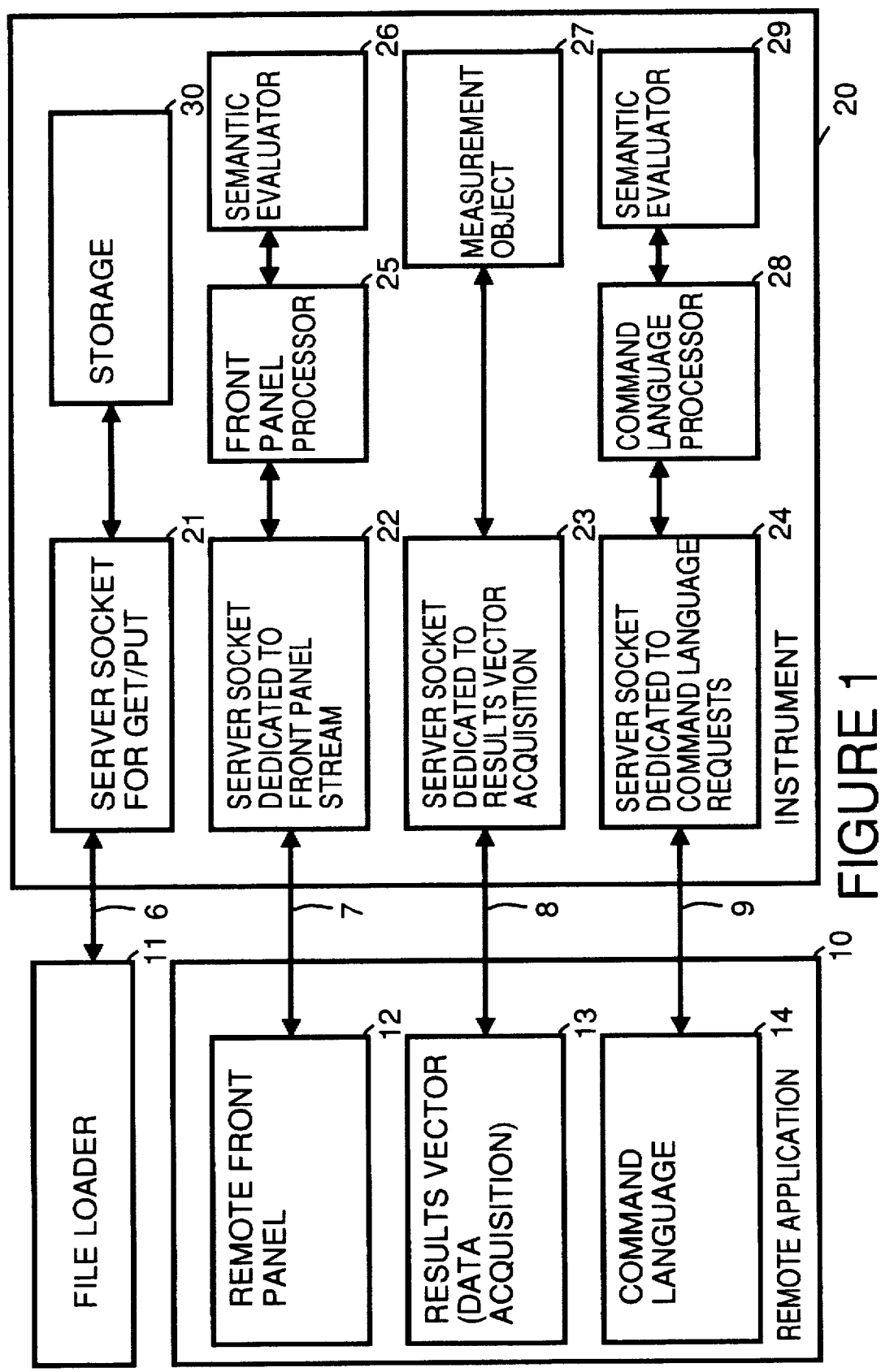
FIG. 1 shows a block diagram of an instrument in communication with a remote application in accordance with a preferred embodiment of the present invention.

FIG. 1 shows a block diagram of an instrument 20 in communication with a remote application 10 in accordance with a preferred embodiment of the present invention. Remote application 10, is for example, a Java applet application which runs within a Web browser application. Instrument 20 is, for example, a vector modulation analyzer instrument. Utilizing client/server terminology, the web browser application is the client and instrument 20 is the server.

In the preferred embodiment, remote application 10 includes a remote front panel module 12, a results vector module 13 and a command language module 14.

Remote front panel module 12 provides for remote control of instrument 20 via display of and user interaction with a graphical user interface which represents front panel controls of instrument 20. Results vector module 13 provides for data acquisition from instrument 20 for real-time dynamic display by remote application 10 to a user. Command language module 14 provides a remote command language request/response scheme for status, control and so on. For example, command language module 14 utilizes the Standard Commands for Programmable Instruments (SCPI) command language (IEEE 488.1, IEEE 488.2).

A file loader 11 is used to load files to and from instrument 20. For example, files are loaded over a port 6 using the HyperText Transfer Protocol (HTTP) GET/PUT commands. Alternatively, this may be done, for example, by extending the functionality of remote application 10 to perform HTTP GET/PUT commands. In the preferred embodiment of the present invention, port 6 corresponds to port 8080 on a Netscape Navigator web browser, available from Netscape Communications Corporation.

Instrument 20 is connected over the internet to a web browser using four sockets. For example, each socket is a two-way application communication channel initiated from the client to the server using industry standard socket protocol. A server socket 21 is used as a general HTTP server for responding to GET/PUT commands. In response to GET commands, server socket loads files from storage 30 to file loader 11. In response to PUT commands, server socket puts files from file loader 11 into the internal file system (within storage 30) of instrument 20.

A server socket 22 is dedicated to receiving requests for pushing keys on a front panel of instrument 20. When a user interacts with a graphic user interface displayed by remote application 10 by, for example, selecting a specific key displayed by the graphic user interface, remote front panel 12 forwards to server socket 22 over a port 7 a pre-determined numeric ("keycode") which is defined to correspond to a particular control function of the instrument. Upon receiving such a keycode, server socket 22 forwards the keycode to front panel processor 25, which, with the help of a semantic evaluator 26, performs the specified control function. For example, the keycodes are generated and transferred in accordance with a JAVA front panel (FP) keycode protocol.

A server socket 23 is dedicated to retrieving data and controlling transforms from results vectors produced by a measurement object 27 within instrument 20. For example, the results vectors are transferred over a port 8 in response to a JAVA results vector (RV) request. Transform control is added to this protocol to allow for the specification of transform settings in the results vector at pre-measurement and post-measurement data acquisition periods within the numeric data format of results vectors.

A server socket 24 is dedicated to receiving and returning command language requests over a port 9 in accordance with predetermined command strings used for control, status and data acquisition. Upon receiving a command language request, server socket 24 forwards the command language to command panel processor 28, which with the help of a semantic evaluator 29 performs the specified command function. For example, the command language requests are SCPI language requests which are compliant with SCPI IEEE 488.2. SCPI IEEE 488.2 is an instrument industry standard protocol extended for the Vector Modulation Analyzer. When instrument 20 is an instrument other than a vector modulation analyzer instrument, another SCPI protocol or other command language can be used. Results passed from instrument 20 to remote application 10 are, for example, in standard SCPI protocol.

For example, server sockets 22, 23 and 24 are C and C++ dedicated socket services. Each of server sockets 22, 23 and 24 continue to provide socket communication during an entire client browser session.

Figure 2:
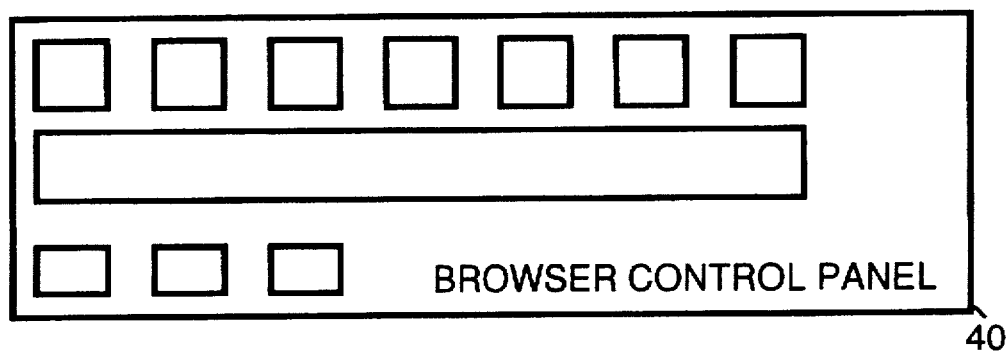
FIG. 2 shows links to instruments in a web page as displayed by the remote application shown in FIG. 1 in accordance with a preferred embodiment of the present invention.
Figure 2:
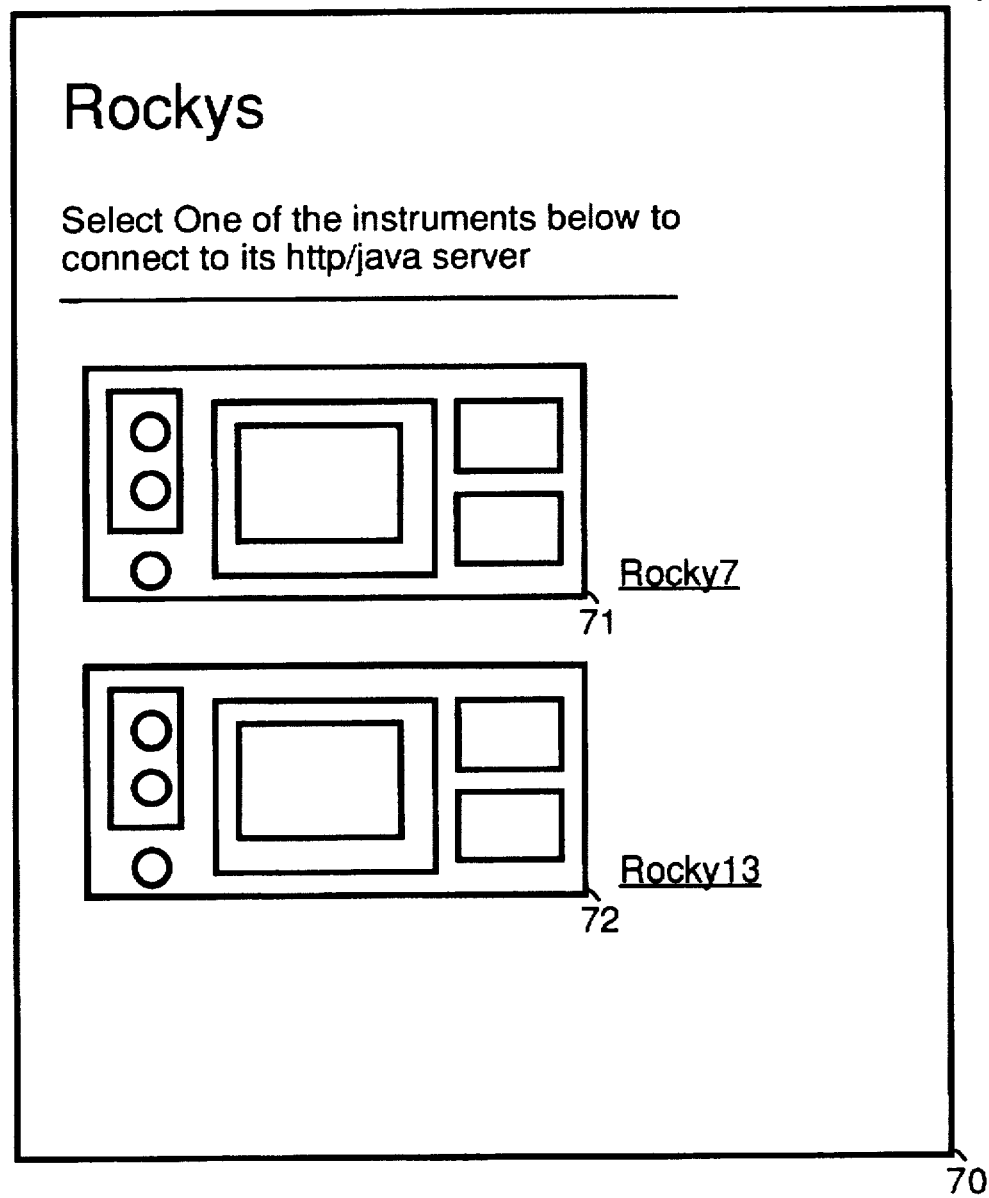

FIG. 2 shows a browser control panel 40. In addition, FIG. 2 shows a HyperText MarkUpLanguage (HTML) web page 70 as displayed by remote application 10, shown in FIG. 1. A Uniform Resource Locator (URL) 71 links remote application 10 to instrument 20. The application class of instrument 20 is linked to web page 70 with an HTTP address made up of the host name (i.e., "Rocky7") of instrument 20 or internet Transmission Control Protocol (TCP)/Internet Protocol (IP) address (e.g., 15.8.162.231), and the remote application port (e.g. port 8080) used for retrieving remote application 10, shown in FIG. 1. For example, the following line in the HTML application language connects a web page to instrument 20:

<A HREF="http://rocky7:8080">

A Uniform Resource Locator (URL) 72 links remote application 10 to a second instrument. The application class of the second instrument is linked to web page 70 with an HTTP address made up of the host name (i.e., "Rocky13") of instrument 20 or internet TCP/IP address, and the remote application port used for retrieving the corresponding remote application. For example, the following line in the HTML application language connects a web page to the second instrument:

<A HREF="http://rocky13:8080">

For example, Uniform Resource Locator (URL) 72 may be for any of a variety of instruments such as a signal source, a signal analyzer, a meter, or a sensor. The instruments represented by URLs on web page 70 do not have to exist in one physical location. For example, one instrument could be on a manufacturing line in Japan and an another instrument could be in the United States. Alternatively, the instruments on web page 70 could be positioned at different points in a single company's manufacturing line. This would allow for remote status, diagnostics, data acquisition and more to be accessed for a variety instruments from a single web page. This could also allow for the manufacturer of an instrument to perform remote debugging of instruments without sending a field service engineer to the actual site of the instruments. In this case, each dedicated web page for an instrument will show, in addition to data, remote diagnostics such as alarms when thresholds are exceeded. As necessary, security is provided to restrict access without correct authorization codes to socket services.

After selecting instrument 20, instrument 20 dynamically loads a web page from instrument 20 to the web browser. The web page is, for example, written in the HTML application language and has a link to automatically load the application classes to perform remote front panel control and data acquisition of remote application 10 before sending selected ASCII protocols to the dedicated socket services within instrument 20. For example, the application classes are JAVA applet network applications.

Figure 3:
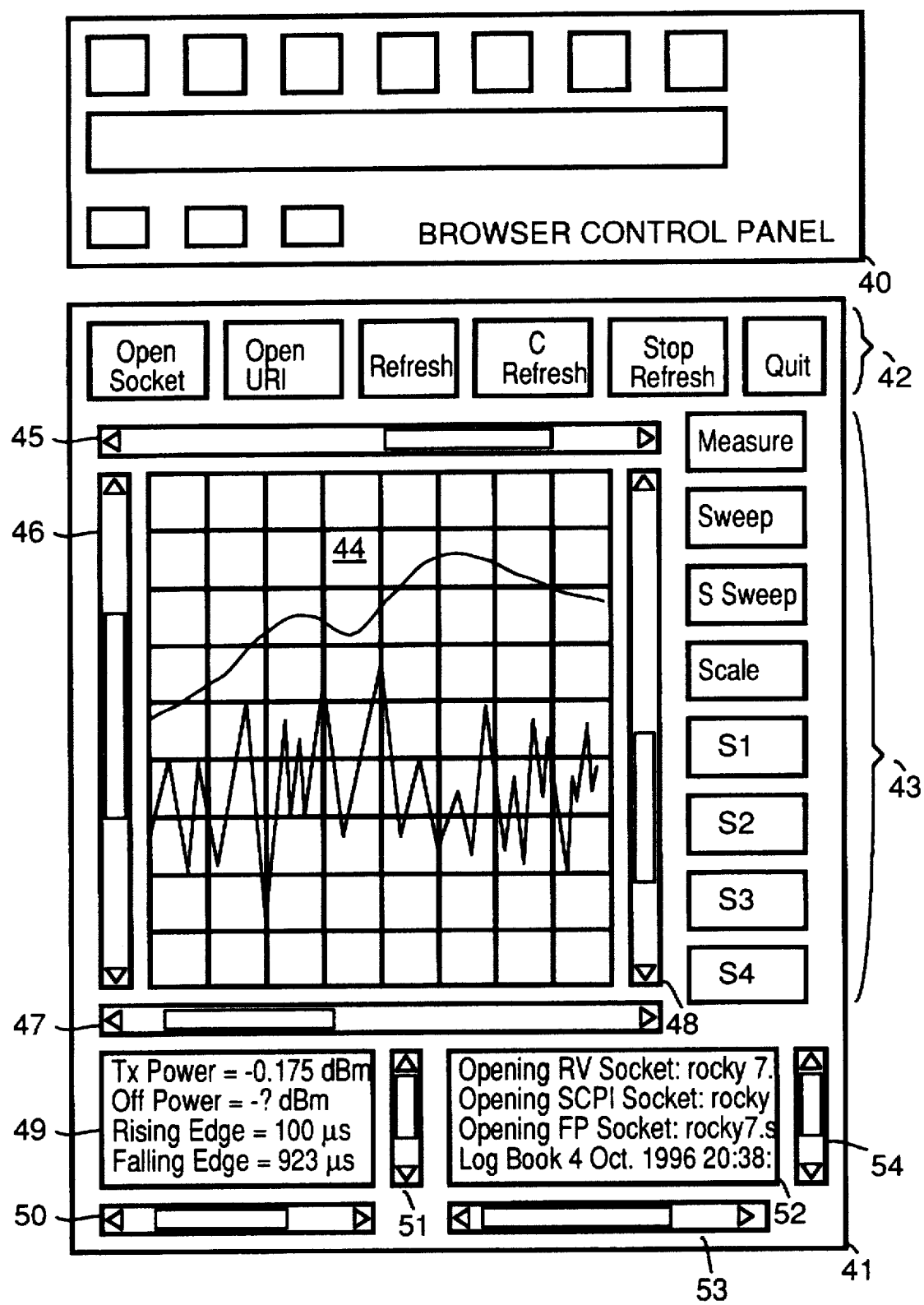
FIG. 3 shows a simplified display of data acquired by the remote application from the instrument shown in FIG. 1 in accordance with a preferred embodiment of the present invention.

FIG. 3 shows a web page 41 resulting when remote application 10 communicates with instrument 20 in a continuous refresh mode used for continuous data acquisition of measurement data. On a graticule 44, two overlapped traces of scaled measurement data are shown displayed. Alternatively, four or some other number of overlapped traces of scaled measurement data are displayed.

A top scroll bar 45 provides the ability to pan the traces on the horizontal axis. Axes are interpreted differently by remote application 10 depending on the measurement chosen. For example, the horizontal axis could represent time or frequency. A left scroll bar 46 provides the ability to pan the traces on the vertical axis. For example, the vertical axis could represent amplitude. A bottom scroll bar 47 provides the ability to scale the traces up or down on the horizontal axis. A right scroll bar 48 provides the ability to scale the traces up or down on the vertical axis. A user can utilize buttons 42 to control the information flow of data between instrument 20 and remote application 10. In the preferred embodiment of the present invention, once information is acquired by remote application 10 from instrument 20, remote application 10 performs, as requested by a user, post processing of the acquired data. The post processing includes, for example, placement of the data in graphic form, as illustrated by the traces placed on graticule 44. Additional post processing can include, for example, providing an average of 100 or more traces in the form of a histogram display, or any other form of post processing as limited only by the processing power of the host running remote application 10.

A dialog box 49 shows ASCII results acquired from the results vector class of instrument 20. A scroll bar 50 and a scroll bar 51 are used to scroll through data in dialog box 49. A dialog box 52 shows status of remote application 10. A scroll bar 53 and a scroll bar 54 are used to scroll through data in dialog box 52.

Buttons 42 and 43 form a graphical user interface that is a remote front panel used to control instrument 20. A user can utilize the graphical user interface to control the information generated by instrument 20.

Figure 4:
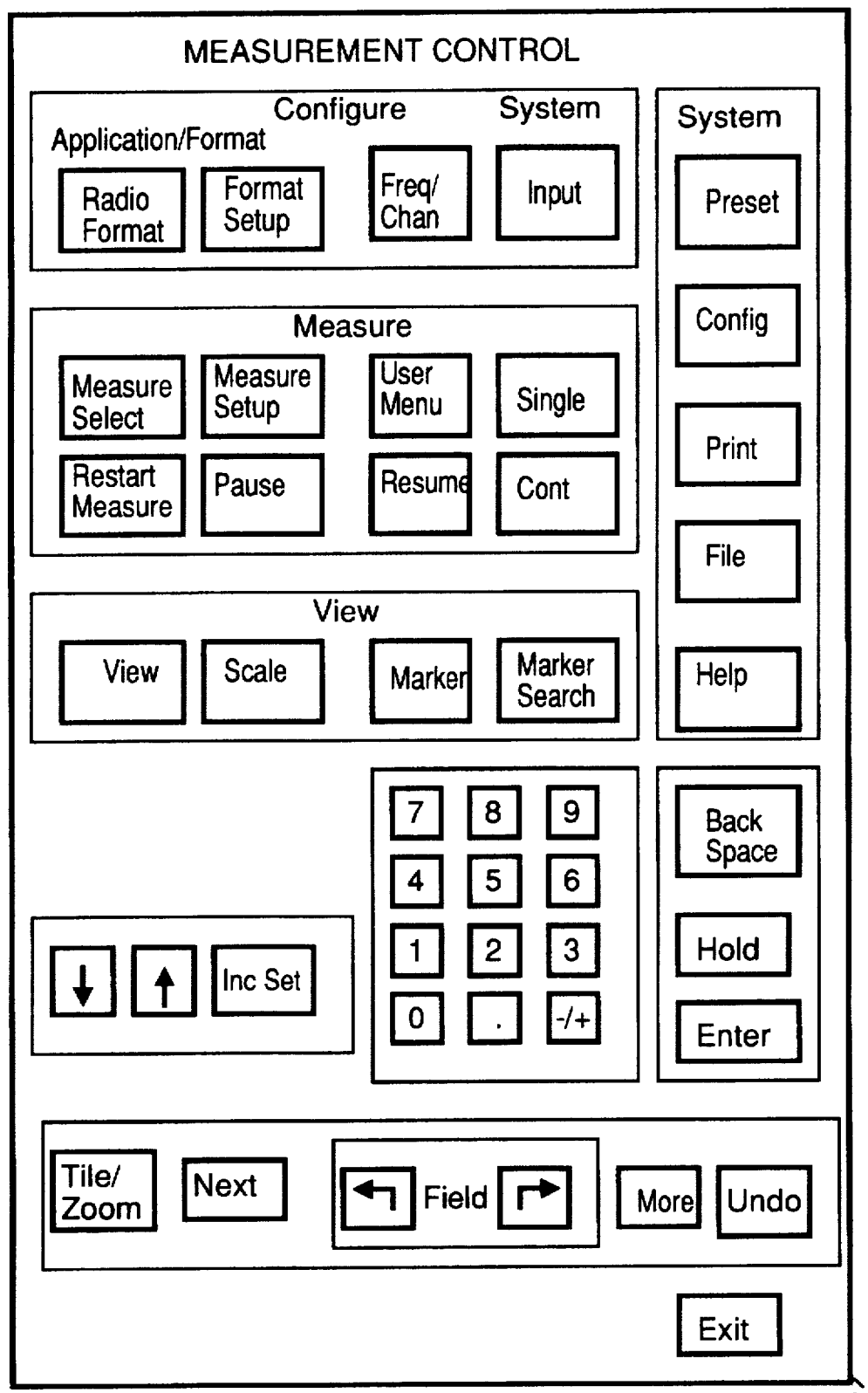
FIG. 4 shows a simplified display of a virtual front panel acquired by the remote application from the instrument shown in FIG. 1 in accordance with a preferred embodiment of the present invention.

FIG. 4 shows a more sophisticated graphical user interface 60 that is a remote front panel used to control instrument 20. Graphical user interface 60 implements advanced features such as markers and labeling. The marker feature allows a user to mark data for later reference. The labeling feature allows a user to associate labels with particular subsets of data.

Figure 5:
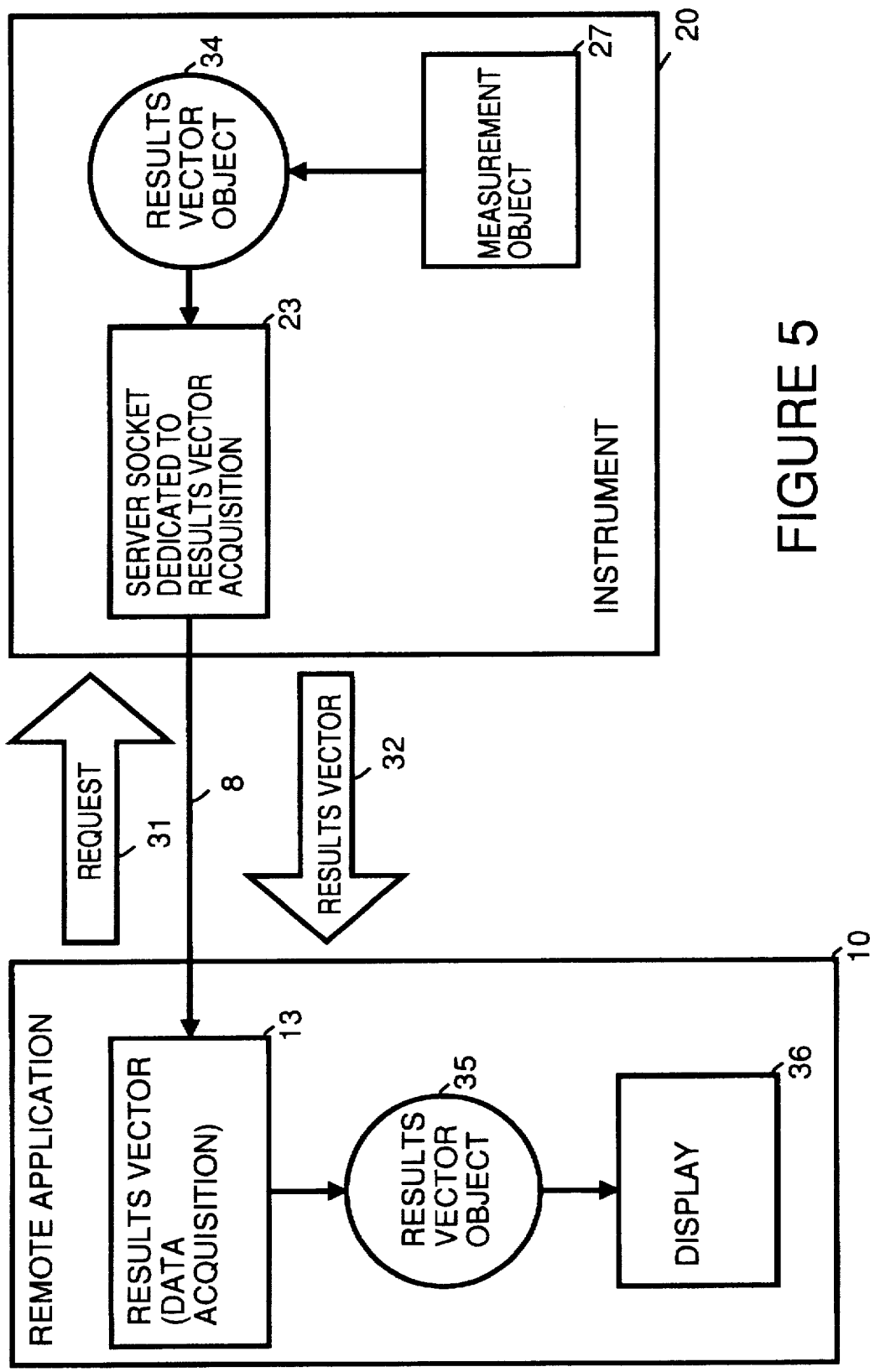
FIG. 5 is a block diagram which illustrates data acquisition from the instrument to the remote application shown in FIG. 1 in accordance with a preferred embodiment of the present invention.

FIG. 5 illustrates data acquisition from instrument 20 by the remote application 10. Application 10 acquires data from instrument 20 using a request/response protocol. Results vector module 13, in response to instructions from a user, sends a request 31 to server socket 23 over port 8, which is dedicated to the transfer of results vectors. Request 31 is for example, an ASCII string. In the preferred embodiment, the ASCII string is "JAVA RV". After forwarding the request to server socket 23, results vector module 13 waits for a results vector to be returned. After server socket 23 receives the request, instrument 20 parses the results vector request and waits for a new results vector. Measurement object 27 forwards a results vector object 34 to server socket 23 after the next measurement is made. Access to the current results vector within instrument 20 is kept under a mutually-exclusive lock. Server socket 23 then transmits a results vector 32 to remote application 10.

In the preferred embodiment of the present invention, results vector 32 is in the form of four arrays of arbitrary length followed by an arbitrary length string which encodes ASCII results data from instrument 20. Server socket 23 constructs results vector 32 in accordance with the algorithm set out in Table 1 below:

TABLE 1

```
for each array of data: (1 through 4)
    {   transmit number of points in array (N) (binary integer)
        for each point of data in array (1 through N)
        {   transmit binary double precision floating point
        }
    }
transmit Results Vector String Length (binary integer)
transmit Results Vector String (binary character stream)
```

In the preferred embodiment, data is compressed with run-length encoding and uses no delimiters. Each array gives information about a single trace. The information is interpreted differently depending on the measurement chosen. The results vector string is an arbitrary length null terminated string encoding any number of scalar results. The results vector also may be interpreted differently depending on the measurement chosen. For example, Table 2 below shows the format for a results vector:

TABLE 2

ASCII Name <sp> ASCII Value Measured <sp> ASCII Units <cr>
ASCII Name <sp> ASCII Value Measured <sp> ASCII Units <cr>
ASCII Name <sp> ASCII Value Measured <sp> ASCII Units <cr>
...

In Table 2 above, <cr>, an abbreviation for <carriage return>, is used as a delimiter between scalar results. Also, <sp>, an abbreviation for <space>, is used as delimiter between the result name and its value and between the value measured and the units.

Upon receipt of results vector 32 by results vector module 13, remote application 10 translates the binary integers, double precision floating point values and binary characters into formats which are native to remote application 10 in order to generate a results vector 35. After performing post processing of the acquired data within results vector 35, remote application 10 displays the acquired data on a display 36. For example, as shown within graticule 44 in FIG. 3, the data is displayed in a rectangular grid plot.

The present invention allows for flexibility in accessing an instrument from a remote application. For example, using the principles of the present invention, a World Wide Web Browser with the capability of using a JAVA applet application, from any location in the world can access an instrument, such as a vector modulation analyzer (VMA) instrument, for remote control, data acquisition of measurement results, screen capture, and status, remote diagnostics and many other uses.

While particular user interfaces and transforms have been described herein, within the umbra of the present invention, new user interfaces can be designed along with new transform (new mathematical transforms, new measurements, or new hardware control/setting) functionalities (changing the resulting data acquisition). Also, since the remote application is stored in the instrument and dynamically loaded to a host this allows the remote application to be upgraded over time at the site of the instrument. This can significantly extend the life of the instrument as well as provide versatility in adapting the instruments to run with remote applications which use various programming platforms.

Further, data acquisition brought in by remote application 10 can be dynamically exported to another program such as the LabView Analysis software running in the same environment and operating system as remote application 10. The LabView Analysis software is available from National Instruments having a business address of 6504 Bride Point Parkway, Austin, Tex. 78730-5039. The Windows operating system, for example, could serve as an environment and operating system suitable for running remote application 10 along with the LabView Analysis software. The Windows operating system is available from Microsoft Corporation having a business address of One Microsoft Way, Redmond, Wash. 98052-6399. Data acquisitions can be exported by remote application 10 to various binary and ASCII file formats, for example to a format compatible with the Excel spreadsheet application available from Microsoft Corporation, the LabView application available from National Instruments and the VEE application available from Hewlett Packard Company having a business address of 3000 Hanover Street, Palo Alto, Calif. 94304.

This versatility also allows for flexibility in providing, for example, context sensitive help retrieval, hot links (such as "Java Beans" linking utilized by the JAVA programming language) and export capability.

Once the dedicated server sockets of instrument 20 are made available over the internet, any remote application, with appropriate capability, can access instrument 20 socket services 21, 22, 23, 24. This allows drivers within existing host applications such as the LabView Analysis software available from National Instruments and the VEE application available from Hewlett Packard Company to be written in any socket networking language to enable access to the dedicated server sockets of instrument 20 for functionality, as discussed above, by remote application 10.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. An instrument comprising:
    storage means for storing control and data acquisition software;
    server means for, upon request from a remote host system, forwarding the control and data acquisition software to the remote host system;
    control response means for, in response to control commands from the control and data acquisition software running on the remote host system, controlling data acquisition of the instrument; and,
    data transmission means for, in response to a data request from the control and data acquisition software running on the remote host system, forwarding acquired data from the instrument to the remote host system, wherein the data transmission means, in response to the data request from the control and data acquisition software running on the remote host system, forwards to the remote host system a results vector.

2. An instrument as in claim 1 wherein the control and data acquisition software is an application which runs as part of an internet browser.

3. An instrument as in claim 1 wherein the server means functions as a HyperText Transfer Protocol (HTTP) server and processes GET commands and PUT commands.

4. An instrument as in claim 1 wherein the control and data acquisition software includes software which, when run on the remote host system, provides a user of the remote host system a graphical user interface which the user can utilize to interact with the instrument.

5. An instrument as in claim 1 wherein the control response means is a server socket dedicated to handling messages pertaining to control of the instrument.

6. A method for providing access to an instrument from a remote host system, the method comprising the steps of:
    (a) storing control and data acquisition software within the instrument;
    (b) in response to the remote host system, forwarding the control and data acquisition software to the remote host system;
    (c) running the control and data acquisition software on the remote host system;
    (d) in response to control commands from the control and data acquisition software running on the remote host system, controlling data acquisition of the instrument; and,
    (e) in response to a request from the control and data acquisition software running on the remote host system, forwarding data acquired in step (d) from the instrument to the remote host system, wherein the data acquired in step (d) is arranged in form as a results vector when sent from the instrument to the remote host system.

7. A method as in claim 6 wherein in step (c) the control and data acquisition software runs as an application within an internet browser.

8. A method as in claim 6 wherein the control and data acquisition software is forwarded to the remote host system in response to a HyperText Transfer Protocol (HTTP) server GET command.

9. A method as in claim 6 wherein step (c) includes providing a user of the remote host system a graphical user interface which the user can utilize to interact with the instrument.

10. A method as in claim 6 additionally comprising the following step:
    (f) displaying on the remote host system the data forwarded in step (e).

11. A method as in claim 10 wherein step (f) includes displaying in graphic form as traces on a graticule the data forwarded in step (e).

12. A method as in claim 6 additionally comprising the following step:
    processing the data forwarded in step (e) before displaying the data forwarded in step (e) on the host system.

13. Remote instrument control and data acquisition software which when run on a host computing system, comprises:
    a control module which provides a user of the host computing system within a world wide web page, a graphical user interface which the user can utilize to interact with a remote instrument; and,
    data acquisition means for transmitting to the remote instrument, over an internet socket, commands which control data acquisition of the remote instrument, and for receiving via internet transfer, data generated by the remote instrument, wherein the data acquisition means includes means for requesting and receiving a results vector from the remote instrument.

14. Remote instrument control and acquisition software as in claim 13 wherein the control and data acquisition software is an application which runs within an internet browser.

15. Remote instrument control and acquisition software as in claim 13 wherein the control module includes implements a network socket dedicated to handling messages pertaining to control of the remote instrument.

16. Remote instrument control and acquisition software as in claim 13 wherein the control module includes a network socket dedicated to requesting and receiving data from the remote instrument.

17. Remote instrument control and acquisition software as in claim 13 additionally comprising:
    display means for displaying on the host system the data generated by the remote instrument.

18. Remote instrument control and acquisition software as in claim 17 wherein the display means displays the data in graphic form as traces on a graticule.

19. Remote instrument control and acquisition software as in claim 17 additionally comprising:
    processing means which processes the data before the data is displayed by the display means.

20. A method for providing access to an instrument from a remote host system, the method comprising the steps of:

(a) storing control and data acquisition software within the instrument;

(b) in response to the remote host system, forwarding the control and data acquisition software to the remote host system;

(c) running the control and data acquisition software on the remote host system;

(d) in response to control commands from the control and data acquisition software running on the remote host system, controlling data acquisition of the instrument;

(e) in response to a request from the control and data acquisition software running on the remote host system, forwarding data acquired in step (d) from the instrument to the remote host system; and, (f) displaying on the remote host system the data forwarded in step (e), wherein step (f) includes displaying in graphic form as traces on a graticule the data forwarded in step (e).

21. Remote instrument control and data acquisition software which when run on a host computing system, comprises:

a control module which provides a user of the host computing system within a world wide web page, a graphical user interface which the user can utilize to interact with a remote instrument;

data acquisition means for transmitting to the remote instrument in response to a request over an internet socket, commands which control data acquisition of the remote instrument, and for receiving via internet transfer, data generated by the remote instrument; and, display means for displaying on the host system the data generated by the remote instrument, wherein the display means displays the data in graphic form as traces on a graticule.

* * * * *